PLATE PRE-REGISTER METHOD

Original Filed May 21, 1957

2 Sheets-Sheet 1

INVENTOR.
ROBERT K. NORTON

BY

William Weigl
ATTORNEY

Dec. 8, 1964 R. K. NORTON 3,160,096

PLATE PRE-REGISTER METHOD

Original Filed May 21, 1957 2 Sheets-Sheet 2

INVENTOR.
ROBERT K. NORTON

BY

William Weigl

ATTORNEY

United States Patent Office 3,160,096
Patented Dec. 8, 1964

3,160,096
PLATE PRE-REGISTER METHOD

Robert K. Norton, Twinsburg, Ohio, assignor to Harris-Intertype Corporation, a corporation of Delaware Continuation of application Ser. No. 660,688, May 21, 1957. This application Dec. 19, 1962, Ser. No. 245,834
2 Claims. (Cl. 101—401.1)

This invention relates generally to a system of preparing printing plates for use on a printing press. Its primary purpose is to facilitate registration in multi-color printing of one plate to another, and to reduce the time consumed in preparing the plates and mounting them on the press. This application is a continuation of my U.S. application, Serial No. 660,688, filed May 21, 1957.

There have been numerous attempts to provide register systems which utilize positive or mechanical registration elements such as pins and holes. Each of the known systems is limited to a particular kind of use, and thus does not have the necessary flexibility for use in a small printing shop for example. Some of the systems carry out what is commonly called the step-and-repeat process in which a negative is mounted in a frame which in turn is movably mounted on a plate holder. The mechanism is indexed across the plate; the image being produced several times in different positions on the same plate. Mechanism of this sort is impractical for those jobs in which a plate is to be made up with a variety of different subjects, some of which may be line copy and others art copy. One system which overcomes the disadvantages of the above mentioned devices is shown and described in U.S. Patent 2,902,770 issued to Raymond W. Mulcahy. As will become apparent later, the invention disclosed in the Mulcahy patent may be used in conjunction with that described herein.

The principal object of this invention is to provide a simple, inexpensive, time-saving method of and apparatus for preparing a plurality of plates in proper registration for use on a printing press.

Another object is to provide a novel type of register system utilizing three slots along a leading edge of a printing plate and a corresponding negative-carrying masking sheet, a middle one of these slots being used for side registering purposes and the end ones being used for front registering purposes, all of said slots being of the width of the pins with which they register but of greater length to compensate for dimensional changes which may occur in the masking sheet.

More specifically, it is an object of the invention to provide a register system using two abutments engaging the leading edge and one abutment engaging a side edge of a printing plate for registering the plate to punches prior to punching the aforesaid slots in the plate, utilizing the slots in subsequent steps of the process for locating image areas on the plate in precise registration with the slots, and thereafter using only one of said slots for side registration on a plate cylinder of a printing press and having the front edge register against abutments on the plate cylinder corresponding to those on the punch.

Other objects and advantages will be apparent from the following description in which reference is had to the accompanying drawings.

Figure 1:
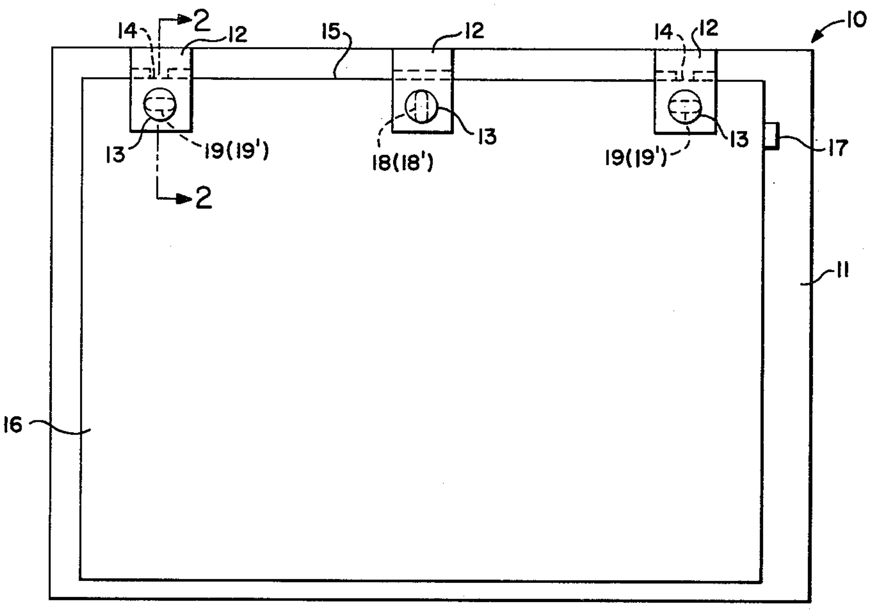
FIG. 1 is a plan view showing a portion of a punching device utilized for providing registering slots in the printing plates and masking sheets of the invention.
Figures 2, 4:
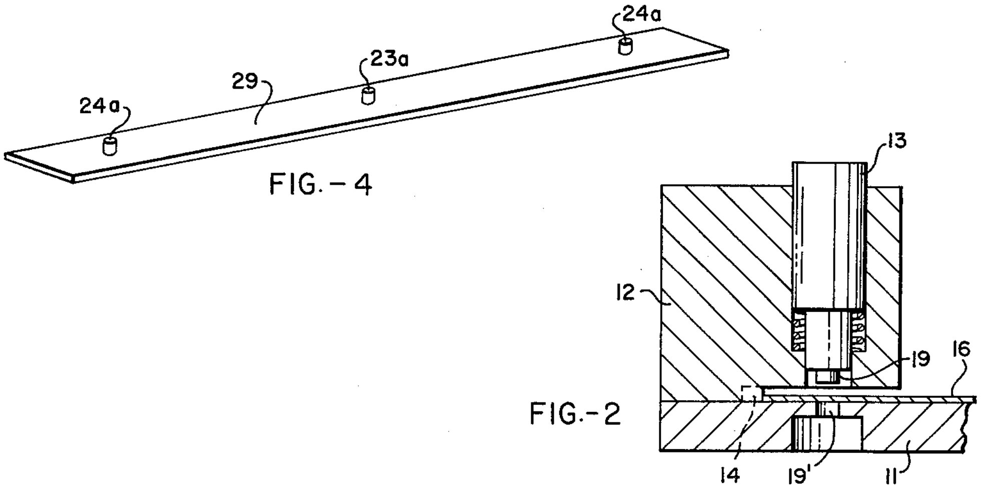
FIG. 2 is a fragmentary elevational view taken along line 2—2 of FIG. 1, on a larger scale.
FIG. 4 is a view of a portable register bar for holding a masking sheet and plate in registration in an exposing frame.

Referring now to FIG. 1, a punching board 10 has a flat top 11. Along one edge there are three upright posts 12 in each of which there is mounted a male punching rod 13 which is spring-urged away from the board. A handle (not shown) is provided to cause all of said rods 13 when actuated to be depressed and pass through a plate 16 on the board into female dies. The rods 13 create elongated, parallel-sided slots to be described shortly. As shown in FIG. 2, the two outer posts 12 have abutments 14 against which a leading edge 15 of the plate 16 is registered. The posts are spaced slightly above the table top 11 to permit the plate 16 to be slid thereunder. It will be noticed that the middle post 12 has no such registering abutment. An abutment 17 is preferably used to side register the plate 16. If desired, the abutment 17 may be laterally adjustable to compensate for different width plates.

When the rods 13 are depressed, male punching portions 18 and 19 cooperate with female dies 18′ and 19′ to punch slots in the leading edge 15 of the plate. It will be noticed that the middle slot, which is preferably in the center of the plate, is perpendicular to and closely adjacent the leading edge of the plate. The end slots are parallel to the leading edge of the plate and are located one on each side of the center slot and are preferably near the side edges of the plate. The pins with which the slots will subsequently engage may be round in cross section or be flattened on opposed sides to be of a thickness the same as that of the slots.

Each of the plates 16 is punched in the same manner. There will be one plate prepared for each color to be printed. A similar or greater number of masking sheets made of thin, relatively stiff, opaque material, such as heavy paper or the like, is punched with slots identical to those made in the plates. The number of masking sheets to be used is dependent on the particular layout of the printing job as will become apparent later.

The press on which the plates are to be subsequently used may be a single color press on which each plate is successively mounted and used for printing. When used on such a press, make-ready time in mounting the plates on the cylinder is reduced to a minimum, since physical registration elements corresponding to register elements used previously are carried on the cylinder and the printing images on each plate are in exact registration with the physical elements. When a multi-color press is used, all of the cylinders are in registration with one another to begin with, that is, the registering elements of one are in positions corresponding to the rest.

Figure 3:
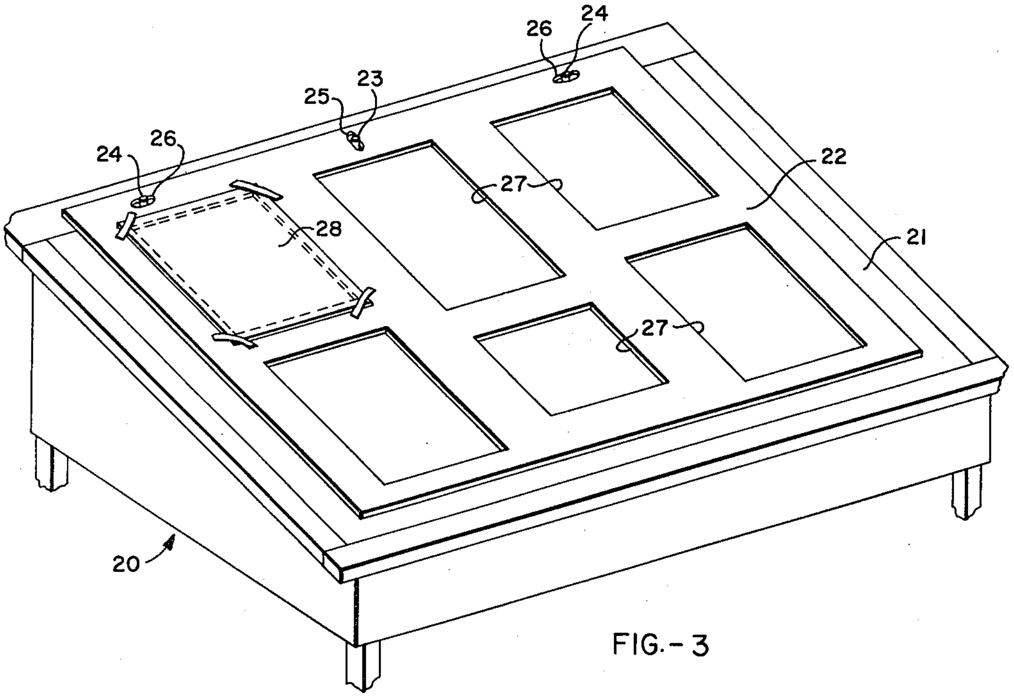
FIG. 3 is a simplified pictorial view of a stripping table in which pieces of negatives are to be mounted on a masking sheet punched by the punch of FIG. 1.
Figure 6:
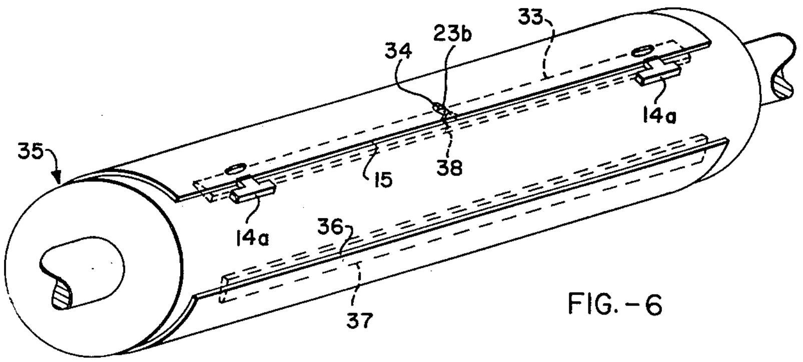
FIG. 6 is a simplified view of a plate cylinder of a printing press showing a plate mounted in registered position thereon.

As shown in FIG. 3, a stripping table 20 has a glass top surface 21 which a light (not shown) illuminates from within the table 20. The table may be of the kind shown and described in the aforementioned Mulcahy patent or may be one in which negatives are visually registered to each other. After the particular layout has been made, a masking sheet 22 punched according to the procedure previously mentioned is located over pins 23 and 24 projecting upwardly from the table top. The masking sheet 22 is fixed to the table 20 by the center pin 23 which side registers it by means of a slot 25 and the pins 24 which front register it by means of slots 26. A T-square is then used to lay out the areas in which negatives are to be located. Cutouts 27 are now made in the masking sheet 22 to serve as windows through which negatives 28 may be seen. Only one piece of film 28 has been shown mounted on the sheet 22 of FIG. 3, it being understood that negatives for the same color are likewise located over each of the other cutout windows 27. If the Mulcahy apparatus is used, the first color masking sheet is removed after it has been thus produced, and the next masking sheet for the second color is mounted on the table and produced in the same manner. Or, if the Mulcahy apparatus is unavailable, the first masking sheet with its negatives mounted thereon by means of pressure sensitive tape or the like may be left in position on the stripping table 20 and a second previously prepared sheet 22 laid over its top. The negatives for the second color corresponding to those of the first color may be visually registered to the negatives of the first color and taped in like fashion to the second sheet 22. Such visual registration is of course facilitated by the light passing through the glass table top 21. If more than two colors are used, the second sheet is removed and the third sheet is placed over the first and registered in the same manner as the second.

Figure 5:
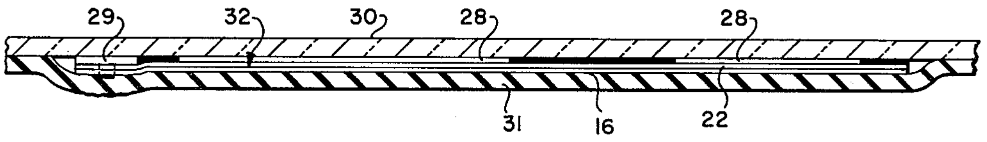
FIG. 5 is a fragmentary sectional view showing the register bar of FIG. 4 holding a plate and masking sheet in registration in a vacuum exposing frame, only a portion of which is shown.

After the masking sheets have been prepared, the plates are ready to be exposed in the vacuum frame or exposing table. A first sheet is then mounted over pins 23*a* and 24*a* mounted on a thin bar 29. As shown, the pins 23*a* and 24*a* are identical to pins 23 and 24 of the stripping table. Bar 29 may in fact be registered to the stripping table in any desired fashion, and removed with the masking sheet for use in the vacuum frame. The plate for the first color is then mounted over the pins 23*a* and 24*a*, and the bar, plate, and masking sheet are then placed in the vacuum frame, a portion of which is shown in FIG. 5. The frame includes a transparent glass top 30 and a rubber mattress 31 spaced therefrom. The top 30 may be hinged to permit placing the combined registered plate and masking sheet on the mattress. When the top is brought down against the sheet and locked, a vacuum chamber 32 between the glass and mattress is evacuated of air to snug the rubber toward the glass top and thus hold the masking sheet and plate tightly against the glass top 30. The pins 23*a* and 24*a* project downwardly toward the mattress 31. It will be seen from FIG. 5 that the pins are of a length slightly greater than the combined thickness of a masking sheet and plate. If desired, the masking sheet and plate and bar may be taped together prior to placing them in the vacuum frame. An arc light or other exposing light shines through the glass and negatives mounted on the masking sheet to burn an image into the light-sensitive surface on the plate 16. After thus exposed, the plate and masking sheet are removed and treated in the customary manner of producing lithographic plates for use on a printing machine. As that process itself is not a part of this invention, it will not be described. The remaining plates are prepared in a like manner by registering them, exposing them in the vacuum frame, and treating them for the lithographic process.

The plates are now ready to be used for printing. The plate for the first color is mounted on a cylinder 35 by inserting it beneath a clamp 33 (shown simply in dotted lines) until the center slot 34 slips over a radially projecting pin 23*b* mounted on the cylinder. Slot 34 is identical to slot 25 in each masking sheet. This side registers the plate 16 on the cylinder. The plate is now slid forward until its leading edge 15 engages a pair of abutments 14*a* which preferably correspond exactly to the abutments 14 of the punch 10. The clamp 33 is then tightened to lock the leading edge of the plate in position on the cylinder 35. The plate is now wrapped around the cylinder 35 and its trailing edge 36 is inserted in a clamp 37 (also shown simply in dotted lines). Clamp 37 is then locked onto the trailing edge 36 of the plate and is moved toward the clamp 33 to tension the plate on the cylinder. Mechanism for tensioning the plate has not been shown since any conventional mechanism for this purpose may be used.

If desired, after the plates have been prepared and are ready to be placed on the cylinder, cutting snips may be used to notch out an area defined by dotted lines 38 so that locating the slot 34 around the pins 23*b* may be easier accomplished, the notch being used as a guiding slot facilitating engagement of the slot with the pin when sliding the plate beneath the clamp 33.

Occasionally, a single image to be printed may be the full size of the plate itself. In such case, a camera back may be provided with pins corresponding to the pins 23 and 24 on the stripping table and a full size negative provided with slots identical to slots 25 and 26. The negative is then exposed in the camera and mounted on the stripping table by means of the slots over a masking sheet which has a full size window cut therein. The remainder of the process previously described is then repeated.

On occasion, a particular printing job may have the windows 27 in the masking sheets so close together that the strips between the windows do not provide enough rigidity in the sheet. In such a case, the apparatus of this invention fills a long-awaited need. By way of example, let us refer to the layout illustrated in FIG. 3. If desired, instead of making one masking sheet for each color, two may be made and exposed separately with the same plate. The first sheet of each set may have three windows in the position of the two top outer windows and the bottom center window. The second sheet of each may have the top center window and the bottom outer windows. The negatives for the separate sheets are maintained registered through the pins 23 and 24. The two sheets are preferably exposed in the vacuum frame one at a time with the plate.

While the invention has been described and is claimed as it relates to multi-color printing, it should be understood to cover a situation in which only a single color is printed, but two or more masking sheet layouts are used for exposure with a single plate. For example, the final printed sheet may be desired to be printed in black alone, some portions of which are to be half-tone art copy and other portions line copy or text material. In such a case, the required exposure time for the two types of copy may be different. It may thus be desirable to set all the half-tone negatives on a first masking sheet and all the line copy negatives on a second sheet, and expose them separately with the same plate.

Various other changes may be made without departing from the spirit and scope of the invention.

Having described my invention, I claim:

1. A method of preparing a plurality of thin, flexible, rectangular light-sensitive printing plates of substantially uniform thickness for use in printing multiple impressions on a printing machine, which comprises the steps of:

(*a*) punching a plurality of spaced registering holes in each plate in corresponding predetermined positions relative to one edge of each plate, (*b*) punching registering holes corresponding to the plate registering holes in and along an edge of each of a plurality of thin, flexible film carrier sheets, (*c*) providing cut-outs in a first one of said sheets in areas selected according to one color of a final desired print, said cut-outs being in predetermined positions relative to the registering holes in said first sheet, (*d*) providing cut-outs in each of said other sheets corresponding to those in the first sheet, (*e*) mounting film pieces with images thereon for said one color over the cut-outs of said first sheet, (*f*) registering each of said other sheets with said first sheet by means of pins accurately fitting the registering holes of the carrier sheets and visually registering and mounting film pieces for other colors over the cut-outs of each other sheet while so registered over the first sheet, (g) superimposing each carrier sheet with its film pieces on a light sensitive side of one of said printing plates and registering said plate and carrier sheet by means of portable registering pins having a length slightly greater than the combined thickness of a carrier sheet and plate and closely and accurately fitting the holes of each mating carrier sheet and plate in order to form a combined portable assembly, (h) compressing each entire combined assembly of pins, carrier sheet and plate one assembly at a time between two substantially flat surfaces at least that one which is adjacent the carrier sheet being rigid and transparent, whereby said film carrier sheet and plate are snugly pressed together and said carrier sheet is snugly pressed against said transparent surface, (i) exposing the film images onto the sensitive side of each plate in turn by means of light passing through the transparent surface, (j) removing and disassembling said assembly, (k) treating each exposed plate to render it capable of producing printing on imprint-receiving material, (l) positioning each treated plate on a cylinder of a printing machine by aligning said one edge thereof against abutments having predetermined locations on said cylinder, and (m) fastening each plate to its cylinder while so aligned.

2. The method according to claim 1 wherein the holes punched in each plate and film carrier sheet comprise a first parallel-sided elongated slot closely adjacent and perpendicular to said one edge of each plate and a corresponding edge of each film carrier sheet, second and third parallel-sided elongated slots closely adjacent and parallel to said one edge of each plate and the corresponding edge of each carrier sheet, and wherein a positioning of the plates on a cylinder physically utilizes both said one edge against said abutments and the first slot in each plate for front and side registration respectively relative to the printing machine.

References Cited by the Examiner

UNITED STATES PATENTS

| | | | |
|---|---|---|---|
| 1,374,859 | 4/21 | Marquardt | 101—415.1 |
| 1,391,117 | 9/21 | Huebner. | |
| 1,480,489 | 1/24 | Banzett. | |
| 2,099,364 | 11/37 | Hunter. | |
| 2,173,168 | 9/39 | Hughes. | |
| 2,192,924 | 3/40 | Maher et al. | |
| 2,331,772 | 10/43 | Gibson. | |
| 2,621,592 | 12/52 | Faeber. | |
| 2,626,858 | 1/53 | McGraw et al. | |

OTHER REFERENCES

Flader, L., et al.: Modern Photoengraving. Chicago, Cincinnati, Modern Photoengraving Publishers, 1948.

Tory, B. E.: Photolithography. Chicago, Graphic Arts Monthly, 1953.

WILLIAM B. PENN, *Primary Examiner.*

DAVID KLEIN, *Examiner.*